April 28, 1925.
T. S. COLLINS
PIPE COUPLING
Filed March 20, 1924
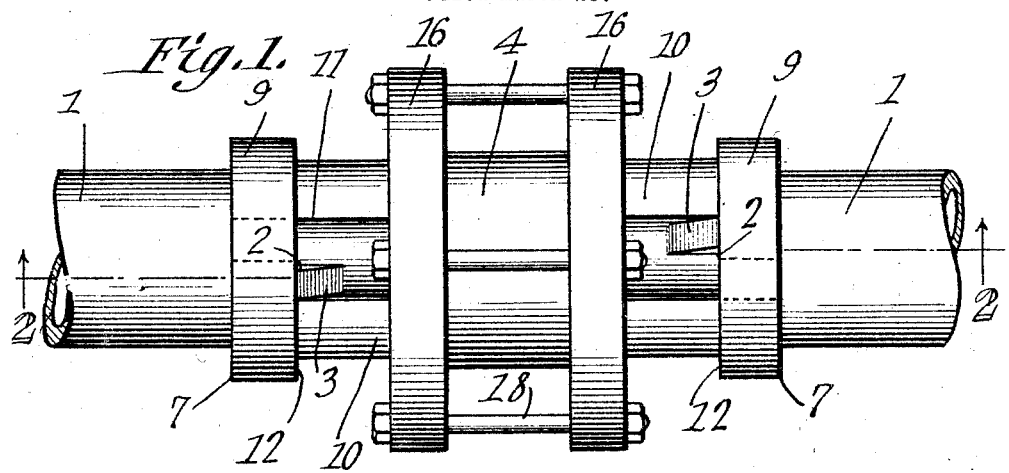
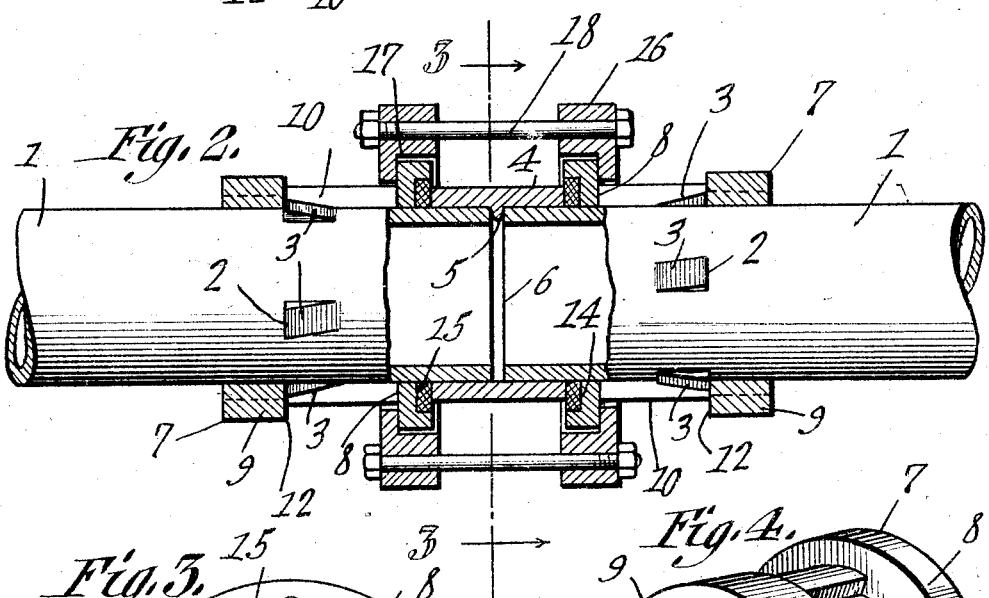
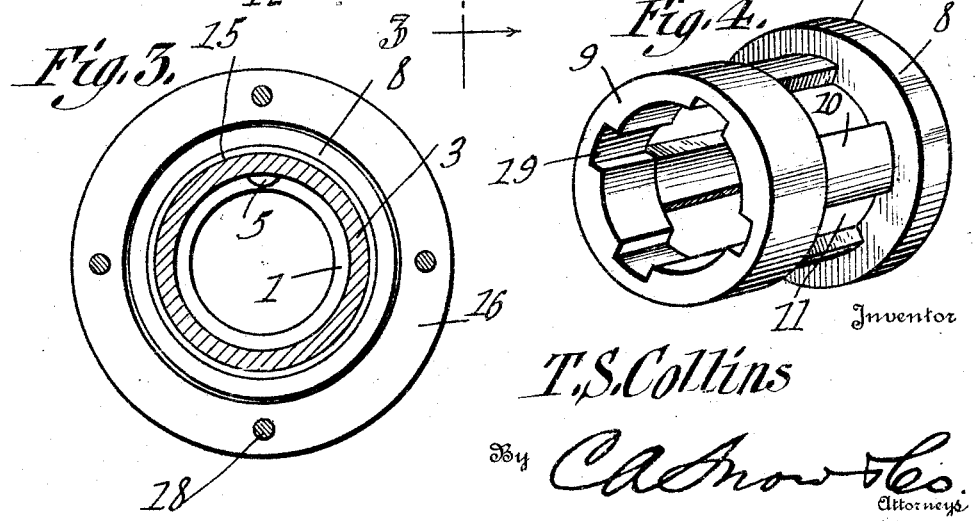
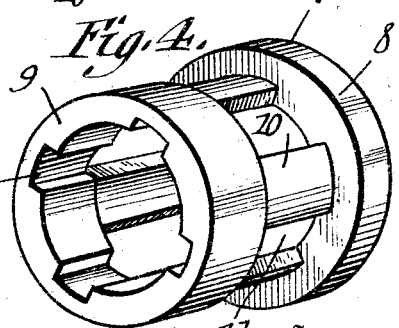
Inventor
T. S. Collins Patented Apr. 28, 1925.

1,535,294

UNITED STATES PATENT OFFICE.

THOMAS S. COLLINS, OF WEST UNION, WEST VIRGINIA.

PIPE COUPLING.

Application filed March 20, 1924. Serial No. 700,665.

*To all whom it may concern:*

Be it known that I, THOMAS S. COLLINS, a citizen of the United States, residing at West Union, in the county of Doddridge and State of West Virginia, have invented a new and useful Pipe Coupling, of which the following is a specification.

The device forming the subject matter of this application is a pipe coupling, adapted to be used primarily but not exclusively on pipe lines which are laid out of doors, upon the slopes of hills and mountains. With couplings as at present constructed, it is necessary always to lay the pipe line uphill, beginning in the valley below and ending at the summit. This plan has many disadvantages, two of which, only, need be mentioned. For instance, the gang generally lays a portion of the line along the summit, descends into the valley, lays the line upwardly along the slope, and then goes down into the valley again, to continue the line, the result being that the gang must make an extra trip up and down the slope. Further, after the line has been laid from the valley to the summit, the part which has been laid up the slope, has to be joined with the part which has been laid upon the height, and in making such a juncture, it is always necessary to cut a section of pipe to bridge the intervening gap. As a matter of fact, the additional cost of laying a pipe line as above described is so great that operators often will lay a pipe line of increased length, to avoid valleys, and to permit the line to be laid along a comparatively level stretch of ground. The device forming the subject matter of this application is so constructed that the pipe line may be strung down-hill, thereby avoiding an unnecessary movement of the gang, obviating the cutting of a joining pipe section to a special length, and saving a considerable amount of piping in that it is not necessary to lay the pipe in a circuitous route, in order to avoid slopes and to keep the pipe line on comparatively level ground.

It is within the province of the disclosure to improve generally and to enhance the utility of devices of that sort to which the invention appertains.

A preferred form of the invention has been shown, but a mechanic, working within the scope of what is claimed, may make such changes as his skill may suggest, without departing from the spirit of the invention.

In the drawings:—Figure 1 shows, in elevation, a device constructed in accordance with the invention; Figure 2 is a section on the line 2—2 of Figure 1, parts being left in elevation. Figure 3 is a section on the line 3—3 of Figure 2; Figure 4 is a perspective view showing one of the anchors.

Numeral 1 marks pipe sections having lugs or shoulders 2 provided with slanting surfaces 3 which facilitate the dragging of the pipe sections along the ground. The ends of the pipe sections 1 are received within a sleeve 4 provided with an internal lug 5, which, being received between the ends of the pipe sections 1, serves to space them apart slightly, as shown at 6 in Figure 2.

Couplings 7 surround the pipe sections 1, each coupling including an annular head 8 and an annular foot 9 connected by ribs 10, there being openings 11 between the ribs, the inner surfaces of the feet 9 of the couplings 7 forming shoulders 12 adapted to cooperate with the lugs 2 on the pipe sections 1, in a way which will be explained hereinafter.

The heads 8 of the couplings 7 have annular seats 14 receiving packing rings 15 which abut against the ends of the sleeve 4. The heads 8 of the couplings 7 are surrounded by collars 16 having recesses 17 for the reception of the heads 8 of the couplings 7. The collars 16 are connected by tightening devices 18, such as bolts. The feet 9 of the couplings 7 are equipped with longitudinal grooves 19 communicating with the openings 11 which exist between the ribs 10.

In practical operation, the couplings 7 are slid on the pipe sections 1, the lugs 2 on the pipe sections 1 passing through the grooves 19 in the feet 9 of the couplings 7, the couplings then being rotated so that the grooves 19 are out of alinement with the lugs 2, the shoulders 12 of the couplings or anchors 7 being engaged by lugs 2 of the pipe sections 1 and being located in the openings 11 between the ribs 10. The collars 16 (which have been mounted on the heads 8 of the couplings 7) are connected by the bolts 18, and the bolts are tightened up thereby causing the collars 16 to move the couplings 7 and the pipe sections 1 toward each other, the packing rings 15 being compressed against the ends of the sleeve 4, to effect hermetic joints. It is to be observed that the collars 16 may be shifted circumferentially with respect to each other, thereby alining the holes in the collars for the reception of the draw-bolts 18.

I claim:—

1. The combination with a pair of pipe sections having lugs, of a sleeve receiving the pipe sections, couplings surrounding the pipe sections and cooperating at their inner ends with the sleeve, the outer ends of the couplings having grooves for the passage of the lugs, the couplings being rotatable to dispose the grooves out of alinement with the lugs, thereby anchoring the couplings on the pipe sections, collars surrounding and engaging the inner ends of the couplings, and tightening devices connecting the collars.

2. In a device of the class described, couplings each comprising an annular head, and annular foot and ribs connecting the head and the foot, the ribs being spaced to define openings, the feet of the couplings having grooves communicating with the openings, pipe sections within the couplings and having lugs adapted to pass through the grooves, and to engage the feet of the couplings when the couplings are rotated, the lugs then being disposed in the openings, a sleeve wherewith the heads of the couplings coact, the ends of the pipe sections being received in the sleeve, and means for drawing the couplings together, said means cooperating with the heads of the couplings.

In testimony that I claim the foregoing as my own, I have hereto affixed my signature.

THOMAS S. COLLINS.